United States Patent [19]
Danna et al.

[11] Patent Number: 6,108,969
[45] Date of Patent: Aug. 29, 2000

[54] TUBULAR LANDSCAPE EDGING

[76] Inventors: Nicholas H. Danna; Marc A. Danna, both of 7240 N. Sonia Way, Tucson, Ariz. 85740

[21] Appl. No.: 09/134,706

[22] Filed: Aug. 14, 1998

[51] Int. Cl.[7] .............................. A01G 1/00; E01C 11/22
[52] U.S. Cl. ....................................... 47/33; 404/7; 404/8
[58] Field of Search .................................. 47/33; 52/102; 239/201, 276; 404/7, 8

[56] References Cited

U.S. PATENT DOCUMENTS

| | | | |
|---|---|---|---|
| 1,373,827 | 4/1921 | Nelson et al. | 43/33 |
| 1,977,021 | 10/1934 | Spencer | 47/33 |
| 3,387,786 | 6/1968 | Rynberk | 239/201 |
| 3,841,022 | 10/1974 | Thodos | 47/33 |
| 3,933,311 | 1/1976 | Lemelson | 239/276 |
| 4,281,473 | 8/1981 | Emalfarb et al. | 47/33 |
| 4,910,910 | 3/1990 | Jones | 47/33 |
| 5,121,569 | 6/1992 | Thomas | 47/33 |
| 5,315,780 | 5/1994 | Thomas | 47/33 |
| 5,377,447 | 1/1995 | Fritch | 47/33 |
| 5,379,546 | 1/1995 | Popp | 47/33 |
| 5,531,044 | 7/1996 | Wallenius | 47/33 |
| 5,715,628 | 2/1998 | Beladakis | 47/33 |

FOREIGN PATENT DOCUMENTS

| | | | |
|---|---|---|---|
| 3717877 | 12/1988 | Germany | 47/33 |
| 329522 | 5/1930 | United Kingdom | 47/33 |
| 399250 | 10/1933 | United Kingdom | 47/33 |
| 1292803 | 10/1972 | United Kingdom | 47/48.5 |

OTHER PUBLICATIONS

"American Nurseryman", advertisement of Morrison Steel Company, p. 168, Jul. 1958.

Primary Examiner—Michael J. Carone
Assistant Examiner—Fredrick T. French, III
Attorney, Agent, or Firm—W. Kirk Mc Cord

[57] ABSTRACT

Improved landscape edging includes a tubular upper portion and a relatively flat lower portion depending from the tubular portion. The tubular portion has plural slots at predetermined intervals along a major axis of the edging. The tubular portion enhances the strength and rigidity of the edging, while the slots provide the needed flexibility to allow the edging to be bent to the desired shape and configuration. The tubular portion is made by roll forming a relatively flat plain or galvanized steel plate after the slots have been punched into the plate. Two rows of slots are punched into the plate so that when the plate is roll formed, a slot is formed on each side of the tubular portion at predetermined intervals therealong.

20 Claims, 2 Drawing Sheets

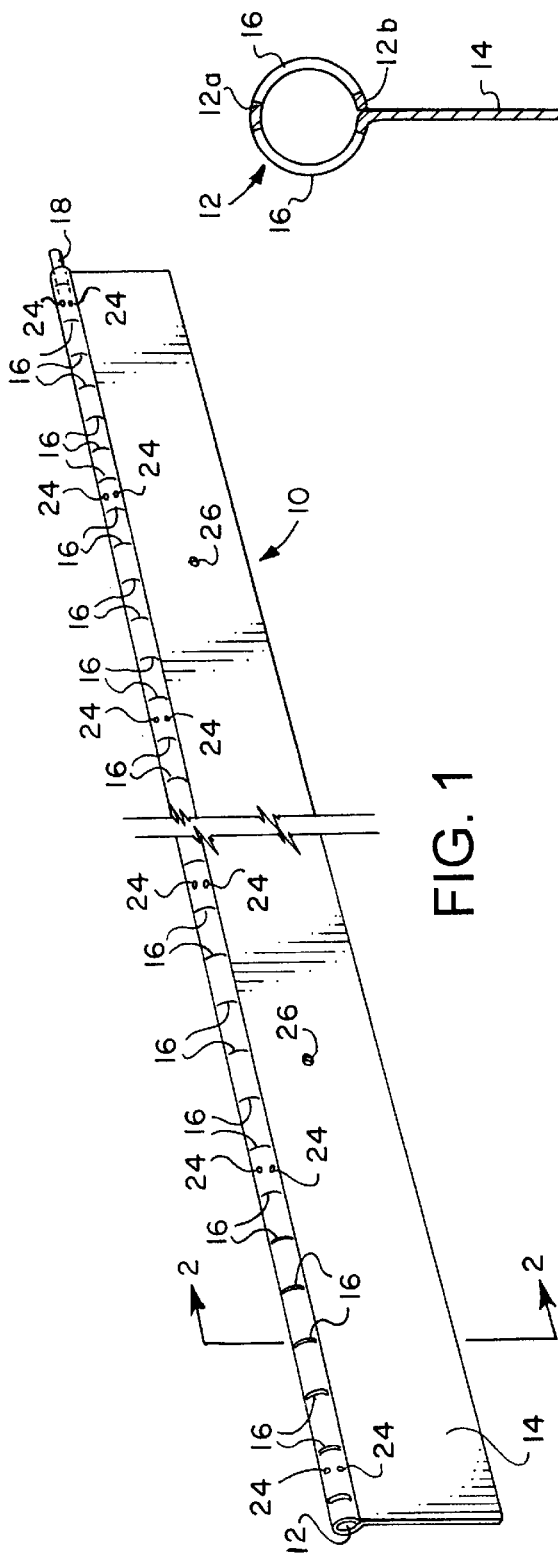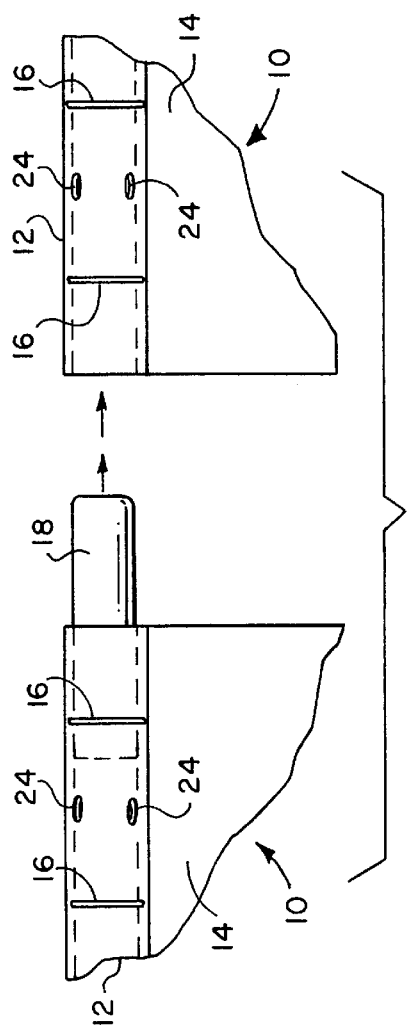

TUBULAR LANDSCAPE EDGING

FIELD OF THE INVENTION

This invention relates generally to landscape edging and in particular to metal landscape edging with enhanced flexibility.

BACKGROUND ART

Various types of landscape edging are known in the art. Typically, such edging is made of a lightweight, but durable material, such as stainless steel, aluminum or plastic. One of the problems associated with metal edging is that it is often not sufficiently flexible to allow the landscaper to bend it into the desired shape. On the other hand, plastic edging, while easily bendable, may not be rigid or durable enough for certain applications.

There is, therefore, a need for landscape edging with sufficient strength and rigidity, but which is also flexible enough to be bendable to achieve desired shapes and configurations.

SUMMARY OF THE INVENTION

In accordance with the present invention, metal landscape edging is provided having a tubular portion and a relatively flat portion depending from the tubular portion. The tubular portion has plural slots spaced at predetermined intervals therealong.

In the preferred embodiment, the tubular portion is formed by curling one edge of a relatively flat metal plate into a generally circular configuration. Prior to forming the tubular portion, the slots are punched into the metal adjacent to the edge which is curled to form the tubular portion. The remainder of the plate defines the relatively flat portion of the edging. The slots are arranged in cooperating pairs, with the individual slots of each pair being aligned along a minor axis of the plate. For example, each pair of slots may be spaced at intervals of about two inches, with the pair closest to each end of the plate being about one inch from the corresponding end. Each pair of slots is spaced at predetermined intervals along a major axis of the plate. When the edge of the plate is curled to form the tubular portion, the two slots of each cooperating pair are aligned circumferentially around the tubular portion. The tubular portion enhances the strength and rigidity of the edging, while the slots provide flexibility to allow the edging to be bent to achieve the desired shape and configuration.

BRIEF DESCRIPTION OF DRAWINGS

FIG. 1 is a perspective view of landscape edging according to the present invention;

FIG. 2 is a sectional view taken along the line 2—2 of FIG. 1;

FIG. 3 is a detailed view illustrating the interconnection of two pieces of edging;

BEST MODE FOR CARRYING OUT THE INVENTION

Figure 4:
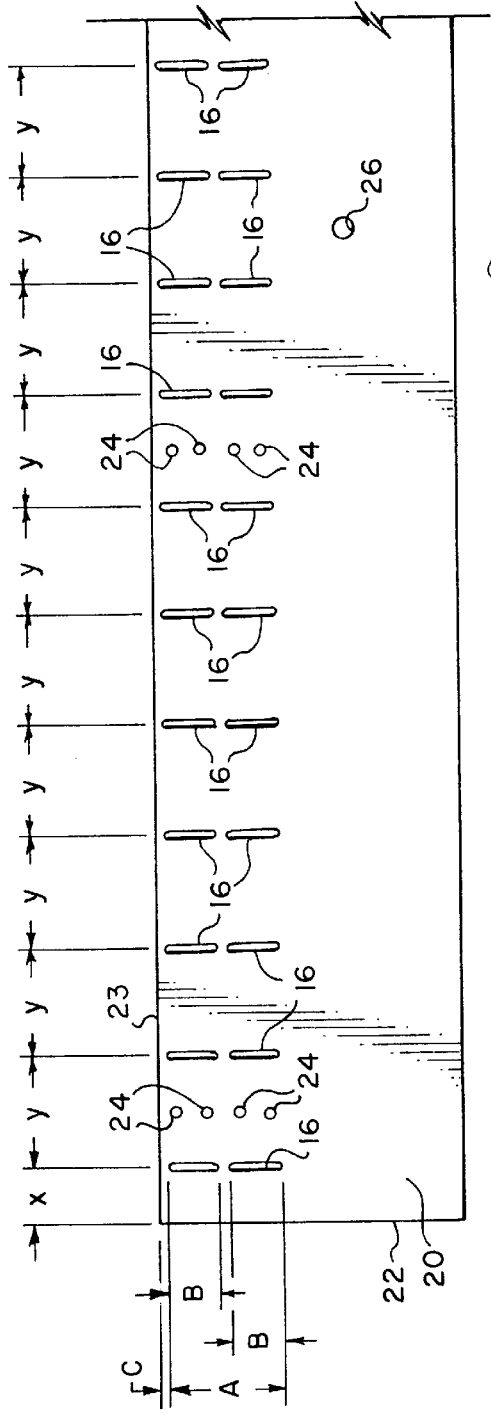
FIG. 4 is a top plan view of a relatively flat metal plate from which the landscape edging of FIG. 1 is formed.

In the description which follows, like parts are marked throughout the specification and drawings with the same respective reference numbers. In some instances, proportions may have been exaggerated in order to more clearly depict certain features of the invention Referring to FIGS. 1 and 2, landscape edging 10 according to the present invention is depicted. Edging 10 is preferably made of twenty to twenty-two gauge plain or galvanized steel and is comprised of a tubular upper portion 12 and a relatively flat lower portion 14, depending from tubular portion 12. As can be best seen in FIG. 2, tubular portion 12 has a generally circular cross-section having an inside diameter in a range from about 0.65 inch to about 0.71 inch.

Plural slots 16 are spaced at predetermined intervals along tubular portion 12, as can be best seen in FIG. 1. Each slot 16 is generally elongated and extends partially around the circumference of tubular portion 12, as can be best seen in FIG. 2. Each slot 16 preferably has a width in a range from about 0.075 inch to about 0.090 inch. Referring also to FIG. 3, tubular portion 12 is closed at one end thereof by means of an end cap 18, which forms the male end of edging 10. Cap 18 is adapted to mate with the female end of another section of edging 10 to attach two section of edging 10 together.

Referring also to FIG. 4, edging 10 is assembled by punching two rows of slots 16 in a relatively flat, rectangular plate 20. Plate 20 preferably has a length of approximately 8.33 feet along its major dimension and a width of approximately 5.5 inches along its minor dimension.

As can be best seen in FIG. 4, slots 16 are arranged in cooperating pairs (one slot 16 in each row), with the individual slots 16 of each pair being aligned along the minor dimension of plate 20. The pair of slots 16 closest to each end 22 of plate 20 is located approximately one inch from the corresponding end 22, as indicated by dimension X. The pairs of slots 16 are spaced apart at intervals of approximately two inches, as indicated by dimension Y. Further, each pair of slots 16 extends along the minor dimension of plate 20 by about two inches, as indicated by dimension A. Each slot 16 is about 0.93 inch long, as indicated by dimension B. The rows of slots 16 are spaced approximately 0.14 inch apart along the minor dimension of plate 20. The row of slots 16 adjacent to side 23 of plate 20 is about 0.125 inch therefrom, as indicated by dimension C.

Figure 6:
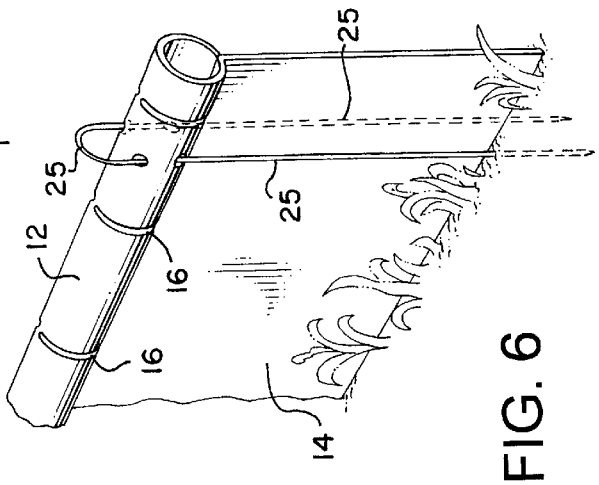
FIG. 6 is a perspective view showing how the edging is staked.

Referring also to FIG. 6, plural generally elliptical holes 24 are formed in plate 20. Holes 24 are adapted to receive stakes 25 for anchoring edging 10 in the ground. Holes 24 are arranged in cooperating groups of four holes 24 with the holes 24 of each group being generally aligned along the minor dimension of plate 20, as can be best seen in FIG. 4. As shown in FIG. 6, each group of four holes 24 is adapted to receive the two legs of a single hairpin stake 25. The group of four holes 24 closest to each end 22 of plate 20 is located approximately two inches from the corresponding end 22 and adjacent groups of stake holes 24 are spaced at intervals of approximately twelve inches along the major dimension of plate 20. As can be best seen in FIGS. 1 and 4, plural drain holes 26 are also formed in plate 20. The drain hole 26 closest to each end 22 of plate 20 is located approximately eighteen inches from the corresponding end 22 and adjacent drain holes 26 are spaced at intervals of approximately sixteen inches along the major dimension of plate 20.

After slots 16, stake holes 24, and drain holes 26 are formed in plate 20, tubular portion 12 is formed by roll forming the portion of plate 20 which is adjacent to side 23, the portion including slots 16 and stake holes 24. The apex 12a (FIG. 2) of tubular portion 12 is defined by a longitudinal axis extending along the major dimension of edging 10 between the two rows of slots 16. Each slot 16 extends partially circumferentially around tubular portion 12. One slot 16 of each cooperating pair is located on one side of apex 12a, while the other slot 16 of the cooperating pair is located on an opposite side of apex 12a, as can be best seen in FIG. 2. Each slot 16 is intermediate apex 12a and a base 12b of tubular portion 12 where relatively flat portion 14 depends from tubular portion 12. As can be best seen in FIG. 4, in each group of four stake holes 24, there are two aligned stake holes 24 on each side of apex 12a.

Figure 5:
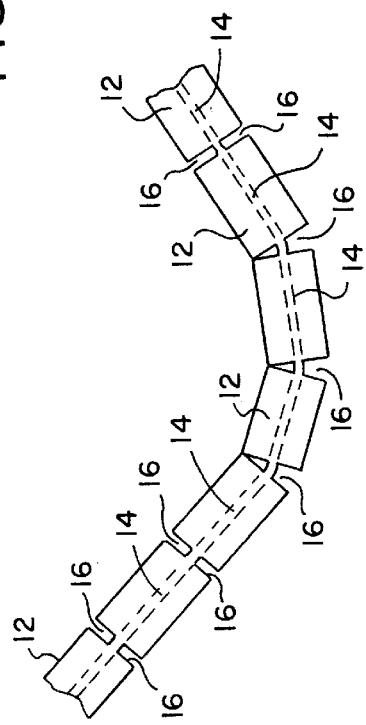
FIG. 5 is a top plan view illustrating how the edging is bendable to a desired shape.

Referring now to FIG. 5, edging 10 is bendable to a desired shape and configuration. Slots 16 allow edging 10 to flex as shown. Yet tubular portion 12 provides sufficient strength and rigidity for edging 10.

The best mode for carrying out the invention has now been described in detail Since changes in and additions to the above-described best mode may be made without departing from the nature, spirit, and scope of the invention, the invention is not to be limited to the above-described details, but only by the appended claims and their equivalents.

We claim:

1. Landscape edging, comprising a tubular portion and a relatively flat portion depending from said tubular portion, said tubular portion having at least one pair of holes generally aligned along a width of said edging, said at least one pair of holes being adapted to receive a stake for anchoring said edging.

2. The edging of claim 1 wherein said tubular portion has plural pairs of holes spaced at predetermined intervals along a length of said edging, the holes of each pair being generally aligned along said width.

3. The edging of claim 1 wherein said tubular portion has an apex, said holes being arranged in at least one cooperating group of four holes, two of the holes of the group being generally aligned along said width on one side of said apex for receiving a stake and the other two holes of the group being generally aligned along said width on an opposite side of said apex for receiving a stake.

4. The edging of claim 3 further including plural cooperating groups of holes spaced at predetermined intervals along a length of said edging, each group having four holes generally aligned along said width.

5. The edging of claim 1 wherein said tubular portion has plural slots spaced at predetermined intervals along a length of said edging.

6. The edging of claim 5 wherein said edging is made by punching a relatively flat plate having a length dimension and a width dimension at spaced intervals along said length dimension to define said slots and said holes and roll forming a portion of said plate which includes said slots and said holes to define said tubular portion.

7. Landscape edging, comprising a tubular portion and a relatively flat portion depending from said tubular portion, said tubular portion having plural slots spaced at predetermined intervals along a length of said edging, said tubular portion having a generally circular cross-section and each of said slots extending only partially around the circumference of said tubular portion.

8. The edging of claim 7 wherein said slots are spaced at intervals of about two inches along said length.

9. The edging of claim 7 wherein said edging is made by roll forming a portion of a relatively flat plate to define said tubular portion.

10. The edging of claim 7 wherein said edging is made by punching a relatively flat plate having a length dimension and a width dimension at spaced intervals along said length dimension to define said slots and roll forming a portion of said plate which includes said slots to define said tubular portion.

11. The edging of claim 10 wherein said slots are arranged in cooperating pairs, the slots of each pair being aligned along said width dimension of said plate, such that when said portion of said plate is roll formed, one of the slots of each pair is located on one side of said tubular portion and the other slot of each pair is located on an opposite side of said tubular portion.

12. The edging of claim 11 further including plural holes punched in said plate, said holes being arranged in cooperating groups of four holes spaced along said length dimension, each group having four holes generally aligned along said width dimension, such that when said portion of said plate is roll formed, two of the holes of each group are generally aligned along said width on said one side of said tubular portion for receiving a stake and the other two holes of each group are generally aligned along said width on said opposite side of said tubular portion for receiving a stake.

13. The edging of claim 7 wherein said slots are arranged in cooperating pairs, the slots of each pair being aligned generally around the circumference of said tubular portion, said tubular portion having an apex extending along said length, one of the slots of each cooperating pair being on one side of said apex and the other slot of each cooperating pair being on an opposite side of said apex.

14. The edging of claim 13 wherein said tubular portion further includes a base from which said relatively flat portion depends, said one of the slots of each cooperating pair extending between said base and said apex on said one side of said apex and said other slot of each cooperating pair extending between said base and said apex on said opposite side of said apex.

15. The edging of claim 7 wherein said tubular portion has at least one pair of holes generally aligned along a width of said edging, said at least one pair of holes being adapted to receive a stake for anchoring said edging.

16. The edging of claim 15 wherein said tubular portion has plural pairs of holes spaced along said length, the holes of each pair being generally aligned along said width.

17. The edging of claim 15 wherein said tubular portion has an apex, said holes being arranged in at least one cooperating group of four holes, two of the holes of the group being generally aligned along said width on one side of said apex for receiving a stake and the other two holes of the group being generally aligned along said width on an opposite side of said apex for receiving a stake.

18. The edging of claim 7 wherein said edging is made of steel.

19. The edging of claim 18 wherein said edging is made of twenty to twenty-two gauge plain steel.

20. The edging of claim 18 wherein said edging is made of twenty to twenty-two gauge galvanized steel.

* * * * *